United States Patent
Amano et al.

(10) Patent No.: US 7,064,945 B2
(45) Date of Patent: Jun. 20, 2006

(54) CAPACITIVE LOAD DRIVING CIRCUIT AND LIQUID CRYSTAL DISPLAY

(75) Inventors: Yuji Amano, Takatsuki (JP); Yoshio Nirasawa, Mukou (JP); Hideo Hamaguchi, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 297 days.

(21) Appl. No.: 10/728,789

(22) Filed: Dec. 8, 2003

(65) Prior Publication Data

US 2004/0169980 A1    Sep. 2, 2004

(30) Foreign Application Priority Data

Feb. 28, 2003   (JP)   ............................. 2003-052270

(51) Int. Cl.
*H02H 9/02*    (2006.01)
(52) U.S. Cl. ................................... 361/93.1
(58) Field of Classification Search ............. 361/93.1; 320/164
See application file for complete search history.

(56) References Cited

U.S. PATENT DOCUMENTS 3,550,025 A * 12/1970 Stodolsky .................. 330/265
4,733,106 A * 3/1988 Okutsu et al. ............. 327/111
6,807,040 B1 * 10/2004 Ivanov et al. .............. 361/93.9

FOREIGN PATENT DOCUMENTS

| JP | 60-13559 | * | 1/1985 | .................. 307/131 |
| JP | 2000174601 | | 6/2000 | |

* cited by examiner

*Primary Examiner*—Brian Sircus
*Assistant Examiner*—Ann T. Hoang
(74) *Attorney, Agent, or Firm*—Stevens, Davis, Miller & Mosher, LLP

(57) ABSTRACT

An output circuit may include a power supply terminal, a ground terminal, and an output terminal connected to a capacitive load. Depending on the state of a load control input signal, the output circuit performs selectively a charging-current supplying operation of supplying a charging-current from the power supply terminal to the capacitive load and a discharging-current withdrawing operation of withdrawing a discharging-current from the capacitive load to the ground terminal. An overcharging-current prevention switch is provided to detect a short circuit between the output terminal and the ground terminal so as to stop or suppress the charging-current supplying operation. An overdischarging-current prevention switch is provided to detect a short circuit between the output terminal and the power supply terminal so as to stop or suppress the discharging-current withdrawing operation.

6 Claims, 5 Drawing Sheets

CAPACITIVE LOAD DRIVING CIRCUIT AND LIQUID CRYSTAL DISPLAY

BACKGROUND OF THE INVENTION

1. Field of the Invention

The present invention relates to a capacitive load driving circuit for driving a capacitive load with charging and discharging-currents, such as a capacitive load driving circuit for driving a common electrode of a liquid crystal display panel. Further, the invention relates to a liquid crystal display using a capacitive load driving circuit.

2. Related Art of the Invention

An example of a capacitive load driving circuit for driving a capacitive load composed of a common electrode of a liquid crystal display panel is disclosed in JP-A 2000-174601.

FIG. 3 is a schematic circuit diagram of a capacitive load driving circuit according to the prior art proposed by the present inventors. In this capacitive load driving circuit, as shown in FIG. 3, an output circuit 21 comprises: a power supply terminal 17 connected to a power supply line (Vcc line); a ground terminal 18 connected to a ground line; and an output terminal 16 connected to a capacitive load CL composed, for example, of a common electrode of a liquid crystal display panel.

The output circuit 21 performs selectively a charging-current supplying operation of supplying a charging-current from the output terminal 16 to the capacitive load CL and a discharging-current withdrawing operation of withdrawing a discharging-current from the capacitive load CL to the output terminal 16. The charging-current supplying operation and the discharging-current withdrawing operation are performed selectively depending on the state of a load control input signal S1 the state (high level or low level) of which varies or alternates periodically. The charging-current supplying operation is continued until the voltage of the output terminal 16 reaches an upper amplitude limit. The discharging-current withdrawing operation is continued until the voltage of the output terminal 16 reaches a lower amplitude limit. The output terminal 16, the power supply terminal 17, and the ground terminal 18 are formed into terminal pins for external connection when the capacitive load driving circuit is implemented in the form of an integrated circuit.

FIG. 4 is a circuit diagram showing a specific configuration of the capacitive load driving circuit of FIG. 3.

In the capacitive load driving circuit, when an earth fault (a short circuit to the ground terminal 18) occurs in the output terminal 16, the voltage of the output terminal 16 is always lower than the upper amplitude limit. This causes a large current to flow ceaselessly through a route connecting the power supply terminal 17, a charging output transistor Q1, the output terminal 16, and the ground terminal 18 in this order, during the period that the load control input signal S1 is high.

Similarly, when a sky fault (a short circuit to the power supply terminal 17) occurs in the output terminal 16, the voltage of the output terminal 16 is always higher than the lower amplitude limit. This causes a large current to flow ceaselessly through a route connecting the power supply terminal 17, the output terminal 16, a discharging output transistor Q2, and the ground terminal 18 in this order, during the period that the load control input signal S1 is low.

As such, in case of an earth fault or a sky fault, an excessive current or overcurrent flows in the output circuit 21. This causes the problem of overheat in the output transistors Q1 and Q2 constituting the output circuit 21 and hence in the integrated circuit containing the capacitive load driving circuit comprising the output transistors Q1 and Q2.

Such an earth fault or sky fault occurs, for example, when terminal pins provided in the integrated circuit package containing the capacitive load driving circuit form a short circuit between them. Here, these terminal pins correspond to the output terminal, the power supply terminal, and the ground terminal. Such a short circuit between the terminal pins occurs, for example, owing to an error during the fabrication or owing to the adhesion of electrically conductive dust or the like to the terminal pins during thus

SUMMARY OF THE INVENTION

An object of the invention is to provide a capacitive load driving circuit and a liquid crystal display in which an overcurrent is prevented from flowing ceaselessly in an output circuit when a short circuit occurs between an output terminal and a power supply terminal or a ground terminal, so that overheat is avoided in the output circuit.

A first aspect of the invention is a capacitive load driving circuit for supplying a charging-current to a capacitive load and withdrawing a discharging-current from the capacitive load, comprising an output circuit and an overcurrent protection circuit.

The output circuit comprises a power supply terminal, a ground terminal, and an output terminal connected to the capacitive load, and performs a charging-current supplying operation of supplying a charging-current from the power supply terminal to the capacitive load and a discharging-current withdrawing operation of withdrawing a discharging-current from the capacitive load to the ground terminal.

The overcurrent protection circuit detects a short circuit between the output terminal and the ground terminal so as to stop or suppress the charging-current supplying operation, and detects a short circuit between the output terminal and the power supply terminal so as to stop or suppress the discharging-current withdrawing operation.

Then, the output circuit selects any one of the charging-current supplying operation and the discharging-current withdrawing operation depending on the state of a control input signal.

According to this configuration provided with the overcurrent protection circuit, when a short circuit occurs between the output terminal and the ground terminal, the charging-current supplying operation is stopped or suppressed. Further, when a short circuit occurs between the output terminal and the power supply terminal, the discharging-current withdrawing operation is stopped or suppressed. Accordingly, an overcurrent is prevented from flowing ceaselessly in an output circuit when a short circuit occurs between the output terminal and the power supply terminal or the ground terminal, so that overheat is avoided in the output circuit.

In the capacitive load driving circuit according to the first aspect, it is preferable that the output circuit continues to charge the capacitive load in the charging-current supplying operation until the electric potential of the capacitive load reaches a predetermined upper amplitude limit lower than the electric potential of the power supply terminal, and continues to discharge the capacitive load in the discharging-current withdrawing operation until the electric potential of the capacitive load reaches a predetermined lower amplitude limit higher than the electric potential of the ground terminal.

According to this configuration, in the charging, when the electric potential of the capacitive load reaches the upper amplitude limit, the charging-current supplying operation is stopped. Further, in the discharging, when the electric potential of the capacitive load reaches the lower amplitude limit, the discharging-current withdrawing operation is stopped. This ensures the constancy of the electric potential of the capacitive load at the upper amplitude limit and the lower amplitude limit in the charging and the discharging, respectively.

In the capacitive load driving circuit according to the first aspect, the output circuit, for example, comprises: a first NPN transistor the collector of which is connected to the power supply terminal and the emitter of which is connected to the output terminal; and a first PNP transistor the collector of which is connected to the ground terminal and the emitter of which is connected to the output terminal.

The overcurrent protection circuit, for example, comprises a second NPN transistor and a second PNP transistor. In the second NPN transistor, the collector is connected to the base of the first NPN transistor, the emitter is connected to the output terminal, and the base is connected to a first voltage supply for generating a predetermined electric potential higher than the electric potential of the ground terminal. In the second PNP transistor, the collector is connected to the base of the first PNP transistor, the emitter is connected to the output terminal, and the base is connected to a second voltage supply for generating a predetermined electric potential lower than the electric potential of the power supply terminal.

The first voltage supply preferably generates a predetermined electric potential higher than the electric potential of the ground terminal and lower than or equal to the lower amplitude limit. The second voltage supply preferably generates a predetermined electric potential lower than the electric potential of the power supply terminal and higher than or equal to the upper amplitude limit.

According to this configuration, the overcurrent protection circuit is constructed by the second NPN transistor, the second PNP transistor, and the first and second voltage supplies. This realizes an overcurrent protection circuit having simple configuration.

In the capacitive load driving circuit according to the first aspect, for example, the state of the control input signal alternates periodically.

A second aspect of the invention is a capacitive load driving circuit for supplying a charging-current to a capacitive load and withdrawing a discharging-current from the capacitive load, comprising an output circuit, a current generation circuit, a charging and discharging control circuit, and an overcurrent protection circuit.

The output circuit comprises a power supply terminal, a ground terminal, and an output terminal connected to the capacitive load, and performs a charging-current supplying operation of supplying a charging-current from the power supply terminal to the capacitive load and a discharging-current withdrawing operation of withdrawing a discharging-current from the capacitive load to the ground terminal.

The current generation circuit selects, depending on the state of a control input signal, any one of a first state where a first current is supplied to the output circuit so as to cause the output circuit to select the charging-current supplying operation and a second state where a second current is supplied to the output circuit so as to cause the output circuit to select the discharging-current withdrawing operation.

The charging and discharging control circuit detects the electric potential of the capacitive load and thereby controls and causes the output circuit to continue the charging-current supplying operation until the electric potential of the capacitive load reaches a predetermined upper amplitude limit, to stop the charging-current supplying operation when the electric potential reaches the predetermined upper amplitude limit, to continue the discharging-current withdrawing operation until the electric potential of the capacitive load reaches a predetermined lower amplitude limit, and to stop the discharging-current withdrawing operation when the electric potential reaches the predetermined lower amplitude limit.

The overcurrent protection circuit detects a short circuit between the output terminal and the ground terminal so as to stop or suppress the charging-current supplying operation, and detects a short circuit between the output terminal and the power supply terminal so as to stop or suppress the discharging-current withdrawing operation.

According to this configuration provided with the overcurrent protection circuit, when a short circuit occurs between the output terminal and the ground terminal, the charging-current supplying operation is stopped or suppressed. Further, when a short circuit occurs between the output terminal and the power supply terminal, the discharging-current withdrawing operation is stopped or suppressed. Accordingly, an overcurrent is prevented from flowing ceaselessly in an output circuit when a short circuit occurs between the output terminal and the power supply terminal or the ground terminal, so that overheat is avoided in the output circuit.

In the capacitive load driving circuit according to the second aspect, the output circuit, for example, comprises: a first NPN transistor the collector of which is connected to the power supply terminal and the emitter of which is connected to the output terminal; and a first PNP transistor the collector of which is connected to the ground terminal and the emitter of which is connected to the output terminal.

The overcurrent protection circuit comprises a second NPN transistor and a second PNP transistor. In the second NPN transistor, the collector is connected to the base of the first NPN transistor, the emitter is connected to the output terminal, and the base is connected to a first voltage supply for generating a predetermined electric potential higher than the electric potential of the ground terminal and lower than or equal to the lower amplitude limit. In the second PNP transistor, the collector is connected to the base of the first PNP transistor, the emitter is connected to the output terminal, and the base is connected to a second voltage supply for generating a predetermined electric potential lower than the electric potential of the power supply terminal and higher than or equal to the upper amplitude limit. The charging and discharging control circuit controls the base currents of the first NPN transistor and the first PNP transistor, so as to control the execution and the stop of the charging-current supplying operation and the discharging-current withdrawing operation.

According to this configuration, the overcurrent protection circuit is constructed by the second NPN transistor, the second PNP transistor, and the first and second voltage supplies. This realizes an overcurrent protection circuit having simple configuration.

In the capacitive load driving circuit according to the second aspect, the charging and discharging control circuit, for example, comprises: a third voltage supply for generating an electric potential equal to the upper amplitude limit; a fourth voltage supply for generating an electric potential equal to the lower amplitude limit; a charging control differential switch circuit one input terminal of which receives the electric potential of the capacitive load, and the other input terminal of which receives the electric potential of the third voltage supply; and a discharging control differential switch circuit one input terminal of which receives the electric potential of the capacitive load, and the other input terminal of which receives the electric potential of the fourth voltage supply.

The charging control differential switch circuit performs on-off control of the base current of the first NPN transistor depending on the result of comparison between the electric potential of the capacitive load and the electric potential of the third voltage supply. Further, the discharging control differential switch circuit performs on-off control of the base current of the first PNP transistor depending on the result of comparison between the electric potential of the capacitive load and the electric potential of the fourth voltage supply.

According to this configuration, the charging control differential switch circuit and the discharging control differential switch circuit for controlling the charging and discharging-currents can shut off completely the charging and discharging-currents supplied to the output circuit. This realizes low electric power consumption. Further, the voltage amplitude appearing in the output terminal is defined by the differential switch circuits, and such differential switch circuits have a good temperature characteristic. This avoids the problem of variation in the voltage amplitude of the output terminal caused by temperature variation.

In this configuration, it is preferable that the electric potentials of the third and fourth voltage supplies are variable, and that the electric potential of the first voltage supply varies in linkage with the electric potential of the fourth voltage supply while the electric potential of the second voltage supply varies in linkage with the electric potential of the third voltage supply.

According to this configuration, the electric potential of the first voltage supply varies in linkage with the electric potential of the fourth voltage supply, while the electric potential of the second voltage supply varies in linkage with the electric potential of the third voltage supply. Accordingly, when the electric potential of the third or the fourth voltage supply is adjusted for the purpose of adjusting the upper amplitude limit or the lower amplitude limit of the capacitive load, avoided is the occurrence of mismatching with the electric potential where the overcurrent protection circuit stops the charging-current supplying operation or the discharging-current withdrawing operation. This avoids the occurrence of abnormality in the control operation of the charging control differential switch circuit and the discharging control differential switch circuit.

In this configuration, it is preferable that the electric potential of the first voltage supply is equal to the electric potential of the fourth voltage supply while the electric potential of the second voltage supply is equal to the electric potential of the third voltage supply.

In the capacitive load driving circuit according to the second aspect, it is preferable that a frequency-dependent impedance element is provided between the current generation circuit and the output circuit, so that a part of the output current of the output circuit is fed back through the frequency-dependent impedance element to the current generation circuit, so that the through-rate is suppressed at the alternation of the output state of the current generation circuit.

According to this configuration, even when the through-rate is high in the load control input signal, the frequency-dependent impedance element restricts the through-rate, so as to permit smooth alternation of the charging and discharging-currents. This avoids an overshoot and an undershoot at the alternation of the charging and discharging-currents. This provides a stable output waveform without an overshoot and an undershoot, and hence avoids a steep change in the charging and discharging-currents.

In the capacitive load driving circuit according to the second aspect, for example, the state of the control input signal alternates periodically.

A third aspect of the invention is a liquid crystal display comprising a liquid crystal display panel common electrode, an output circuit, and an overcurrent protection circuit.

The output circuit comprises a power supply terminal, a ground terminal, and an output terminal connected to the liquid crystal display panel common electrode, and performs a charging-current supplying operation of supplying a charging-current from the power supply terminal to the liquid crystal display panel common electrode and a discharging-current withdrawing operation of withdrawing a discharging-current from the liquid crystal display panel common electrode to the ground terminal.

The overcurrent protection circuit detects a short circuit between the output terminal and the ground terminal so as to stop or suppress the charging-current supplying operation, and detects a short circuit between the output terminal and the power supply terminal so as to stop or suppress the discharging-current withdrawing operation.

Then, the output circuit selects any one of the charging-current supplying operation and the discharging-current withdrawing operation depending on the state of a control input signal.

According to this configuration provided with the overcurrent protection circuit, when a short circuit occurs between the output terminal and the ground terminal, the charging-current supplying operation is stopped or suppressed. Further, when a short circuit occurs between the output terminal and the power supply terminal, the discharging-current withdrawing operation is stopped or suppressed. Accordingly, an overcurrent is prevented from flowing ceaselessly in an output circuit when a short circuit occurs between the output terminal and the power supply terminal or the ground terminal, so that overheat is avoided in the output circuit.

Further, in case that the output circuit and the overcurrent protection circuit are implemented in the form of an IC and attached to a liquid crystal display panel, the above-mentioned configuration avoids the necessity of providing separately a protection circuit between the IC and the liquid crystal display panel common electrode, so as to reduce the number of components. Further, overheat is avoided in the output circuit, so that the safety in the liquid crystal display driving system is improved.

A fourth aspect of the invention is a liquid crystal display comprising a liquid crystal display panel common electrode, an output circuit, a current generation circuit, a charging and discharging control circuit, and an overcurrent protection circuit.

The output circuit comprises a power supply terminal, a ground terminal, and an output terminal connected to the liquid crystal display panel common electrode, and performs a charging-current supplying operation of supplying a charging-current from the power supply terminal to the liquid crystal display panel common electrode and a discharging-current withdrawing operation of withdrawing a discharging-current from the liquid crystal display panel common electrode to the ground terminal.

The current generation circuit selects, depending on the state of a control input signal, any one of a first state where a first current is supplied to the output circuit so as to cause the output circuit to select the charging-current supplying operation and a second state where a second current is supplied to the output circuit so as to cause the output circuit to select the discharging-current withdrawing operation.

The charging and discharging control circuit detects the electric potential of the liquid crystal display panel common electrode and thereby controls and causes the output circuit to continue the charging-current supplying operation until the electric potential of the liquid crystal display panel common electrode reaches a predetermined upper amplitude limit, to stop the charging-current supplying operation when the electric potential reaches the predetermined upper amplitude limit, to continue the discharging-current withdrawing operation until the electric potential of the liquid crystal display panel common electrode reaches a predetermined lower amplitude limit, and to stop the discharging-current withdrawing operation when the electric potential reaches the predetermined lower amplitude limit.

The overcurrent protection circuit detects a short circuit between the output terminal and the ground terminal so as to stop or suppress the charging-current supplying operation, and detects a short circuit between the output terminal and the power supply terminal so as to stop or suppress the discharging-current withdrawing operation.

According to this configuration provided with the overcurrent protection circuit, when a short circuit occurs between the output terminal and the ground terminal, the charging-current supplying operation is stopped or suppressed. Further, when a short circuit occurs between the output terminal and the power supply terminal, the discharging-current withdrawing operation is stopped or suppressed. Accordingly, an overcurrent is prevented from flowing ceaselessly in an output circuit when a short circuit occurs between the output terminal and the power supply terminal or the ground terminal, so that overheat is avoided in the output circuit.

Further, similarly in the third aspect of the invention, the number of components is reduced, while the safety in the liquid crystal display driving system is improved. Further, electric power consumption is reduced.

DETAILED DESCRIPTION OF THE INVENTION

Embodiments of the invention are described below with reference to the drawings.

Figure 1:
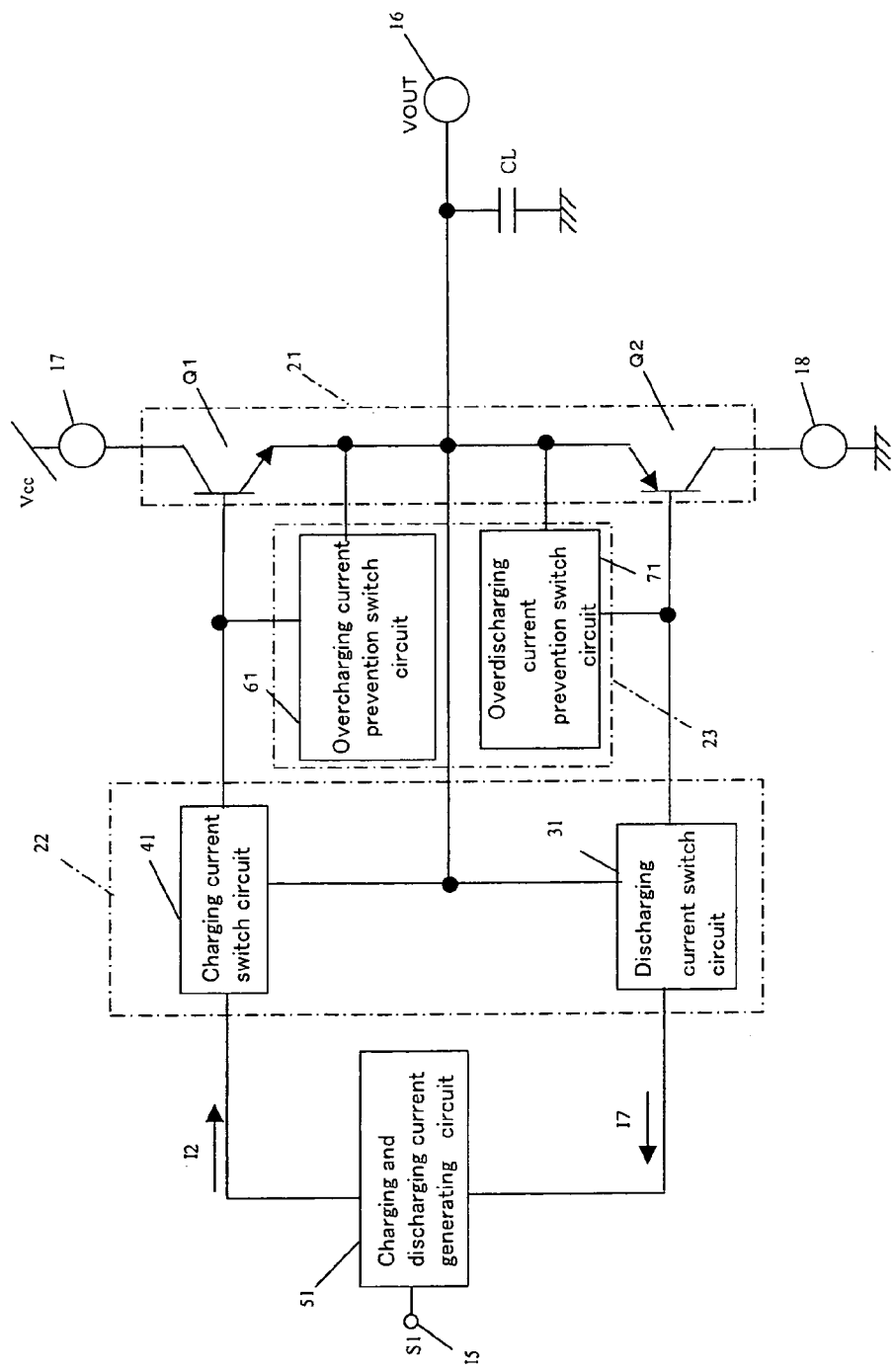
FIG. 1 is a circuit diagram showing schematic configuration of a capacitive load driving circuit according to an embodiment of the invention.
Figure 3:
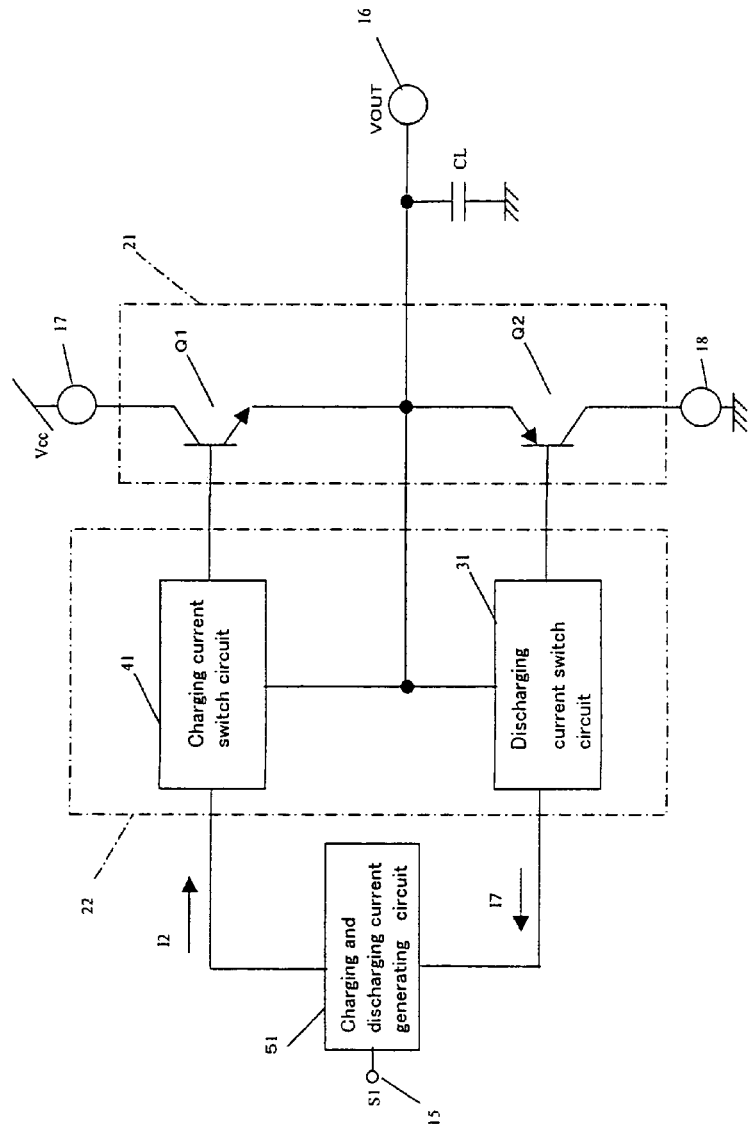
FIG. 3 is a circuit diagram showing schematic configuration of a capacitive load driving circuit according to the prior art.

FIG. 1 is a circuit diagram showing schematic configuration of a capacitive load driving circuit according to an embodiment of the invention. The capacitive load driving circuit has such a configuration that an overcurrent protection circuit 23 is added to the configuration of FIG. 3. The other points in the configuration are the same as those of the capacitive load driving circuit of FIG. 3.

The overcurrent protection circuit 23 detects a short circuit (earth fault) between an output terminal 16 and a ground terminal 18 so as to stop or suppress a charging-current supplying operation performed by a charging-current switch circuit 41 of a charging and discharging control circuit 22. Further the overcurrent protection circuit 23 detects a short circuit (sky fault) between the output terminal 16 and a power supply terminal 17 so as to stop or suppress a discharging-current withdrawing operation performed by a discharging-current switch circuit 31 of the charging and discharging control circuit 22.

This capacitive load driving circuit is described below in detail.

In the capacitive load driving circuit, as shown in FIG. 1, an output circuit 21 comprises: a power supply terminal 17 connected to a power line (Vcc line); a ground terminal 18 connected to a ground line; and an output terminal 16 connected to a capacitive load CL composed, for example, of a common electrode of a liquid crystal display panel.

The output circuit 21 performs selectively a charging-current supplying operation of supplying a charging-current from the output terminal 16 to the capacitive load CL and a discharging-current withdrawing operation of withdrawing a discharging-current from the capacitive load CL to the output terminal 16. The charging-current supplying operation and the discharging-current withdrawing operation are performed selectively depending on the state of a load control input signal S1 the state (high level or low level) of which varies or alternates periodically. The charging-current supplying operation is continued until the voltage of the output terminal 16 reaches an upper amplitude limit. The discharging-current withdrawing operation is continued until the voltage of the output terminal 16 reaches a lower amplitude limit. The output terminal 16, the power supply terminal 17, and the ground terminal 18 are formed into terminal pins for external connection when the capacitive load driving circuit is implemented in the form of an integrated circuit.

For the purpose of the above-mentioned operations, the output circuit 21 comprises two output transistors Q1 and Q2 interconnected in series. The output transistor Q1 is composed of an NPN transistor. The collector is connected to the power supply terminal 17, while the emitter is connected to the output terminal 16. The output transistor Q2 is composed of a PNP transistor. The collector is connected to the ground terminal 18, while the emitter is connected to the output terminal 16.

The output transistor Q1 the collector of which is connected to the power supply terminal 17 supplies a charging-current from the VCC power line to the capacitive load CL. The output transistor Q2 the collector of which is connected to the ground terminal 18 withdraws a discharging-current from the capacitive load CL to the ground line.

The base current of the output transistor Q1 is supplied through the charging-current switch circuit 41. The base current of the output transistor Q2 is withdrawn through the discharging-current switch circuit 31. The discharging-current switch circuit 31 and the charging-current switch circuit 41 are connected to a charging and discharging-current generating circuit 51.

The charging and discharging-current generating circuit 51 outputs a first current I2 for charging-current generation and a second current I7 ford is charging-current generation.

The first current I2 is supplied as a base current to the output transistor Q1. The second current I7 is withdrawn as a base current from the output transistor Q2.

An input terminal 15 of the charging and discharging-current generating circuit 51 receives a pulse-shaped load control input signal S1 the state of which alternates periodically between a high level and a low level.

Depending on the state of the load control input signal S1, the charging and discharging-current generating circuit 51 selects any one of a first state where the first current I2 is supplied to the output circuit 21 so as to cause the output circuit 21 to select the charging-current supplying operation and a second state where the second current I7 is supplied to the output circuit 21 so as to cause the output circuit 21 to select the discharging-current withdrawing operation.

The charging-current switch circuit 41 and the discharging-current switch circuit 31 constitute the charging and discharging control circuit 22. The charging and discharging control circuit 22 monitors or detects the electric potential of the capacitive load CL, and thereby controls the output circuit 21 as follows. That is, the charging and discharging control circuit 22 controls and causes the output circuit 21 to continue the charging-current supplying operation until the electric potential of the capacitive load CL reaches a predetermined upper amplitude limit V2, and to stop the charging-current supplying operation when the electric potential reaches the predetermined upper amplitude limit V2. Further, the charging and discharging control circuit 22 controls and causes the output circuit 21 to continue the discharging-current withdrawing operation until the electric potential of the capacitive load CL reaches a predetermined lower amplitude limit V1, and to stop the discharging-current withdrawing operation when the electric potential reaches the predetermined lower amplitude limit V1.

More specifically, the charging and discharging control circuit 22 controls the base currents of the output transistors Q1 and Q2, so as to control the execution and the stop of the charging-current supplying operation and the discharging-current withdrawing operation.

As described above, the electric potential of the output terminal 16 is monitored by the discharging-current switch circuit 31 and the charging-current switch circuit 41. The charging-current switch circuit 41 shuts off the charging-current from the output transistor Q1 in such a manner that the electric potential VOUT of the output terminal 16 does not go higher than the predetermined upper amplitude limit V2. The discharging-current switch circuit 31 shuts off the discharging-current from the output transistor Q2 in such a manner that the electric potential VOUT of the output terminal 16 does not go lower than the predetermined lower amplitude limit The overcurrent protection circuit 23 comprises: an overcharging-current prevention switch circuit 61 for detecting a short circuit (earth fault) between the output terminal 16 and the ground terminal 18 so as to stop or suppress the charging-current supplying operation performed by the charging-current switch circuit 41 of the charging and discharging control circuit 22; and an overdischarging-current prevention switch circuit 71 for detecting a short circuit (sky fault) between the output terminal 16 and the power supply terminal 17 so as to stop or suppress the discharging-current withdrawing operation performed by the discharging-current switch circuit 31 of the charging and discharging control circuit 22.

In this overcurrent protection circuit 23, when a short circuit (sky fault) occurs between the output terminal 16 and the power supply terminal 17, the overdischarging-current prevention switch circuit 71 shuts off or restricts the current I7, which is the base current of the discharging output transistor Q2, so as to prevent an overdischarging-current from flowing ceaselessly through the output transistor Q2. When a short circuit (earth fault) occurs between the output terminal 16 and the ground terminal 18, the overcharging-current prevention switch circuit 61 shuts off or restricts the current I2, which is the base current of the charging output transistor Q1, so as to prevent an over charging-current from flowing ceaselessly through the output transistor Q1. This avoids overheat in the output circuit.

Figure 2:
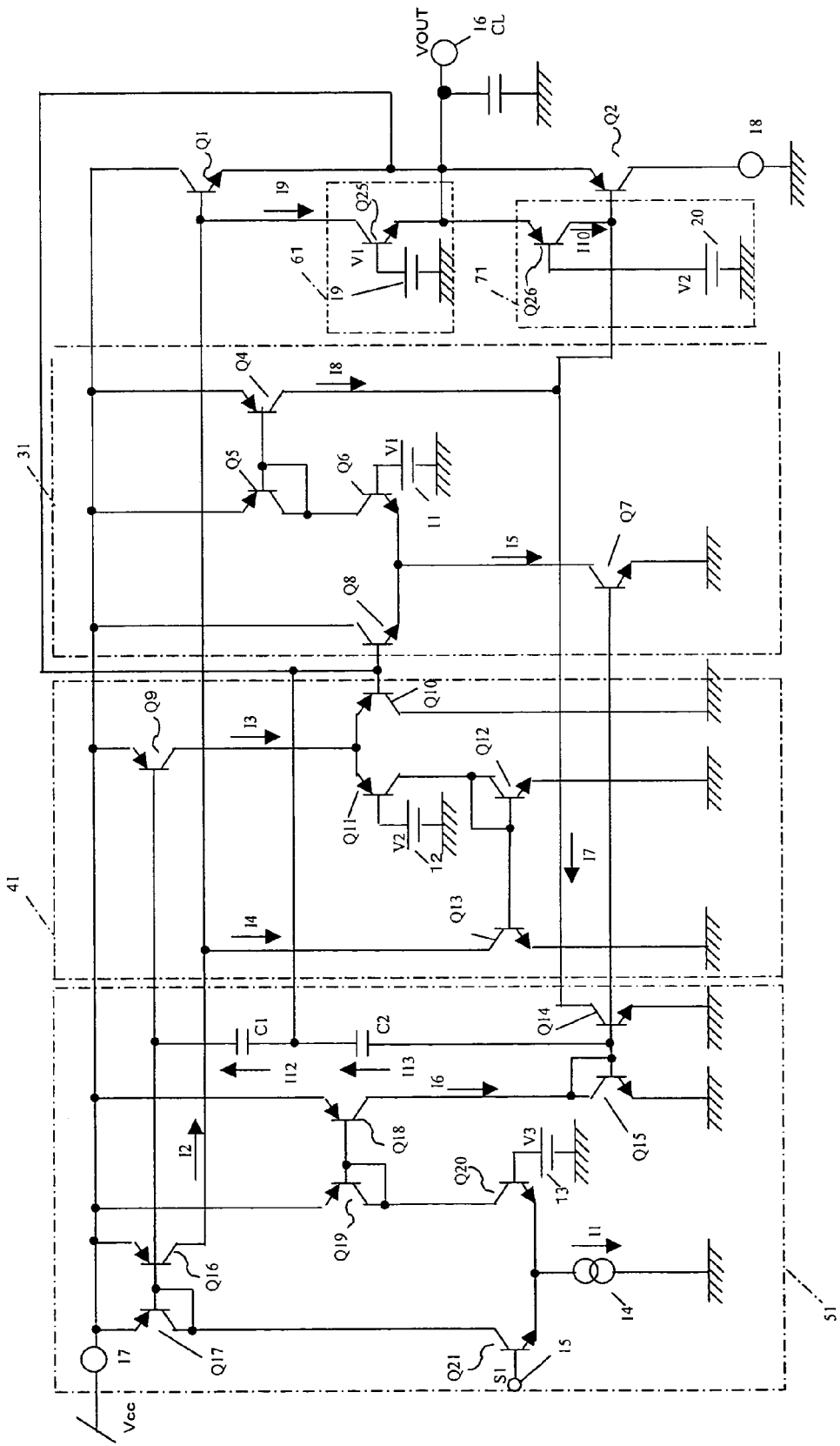
FIG. 2 is a circuit diagram showing detailed configuration of the capacitive load driving circuit of FIG. 1.
Figure 4:
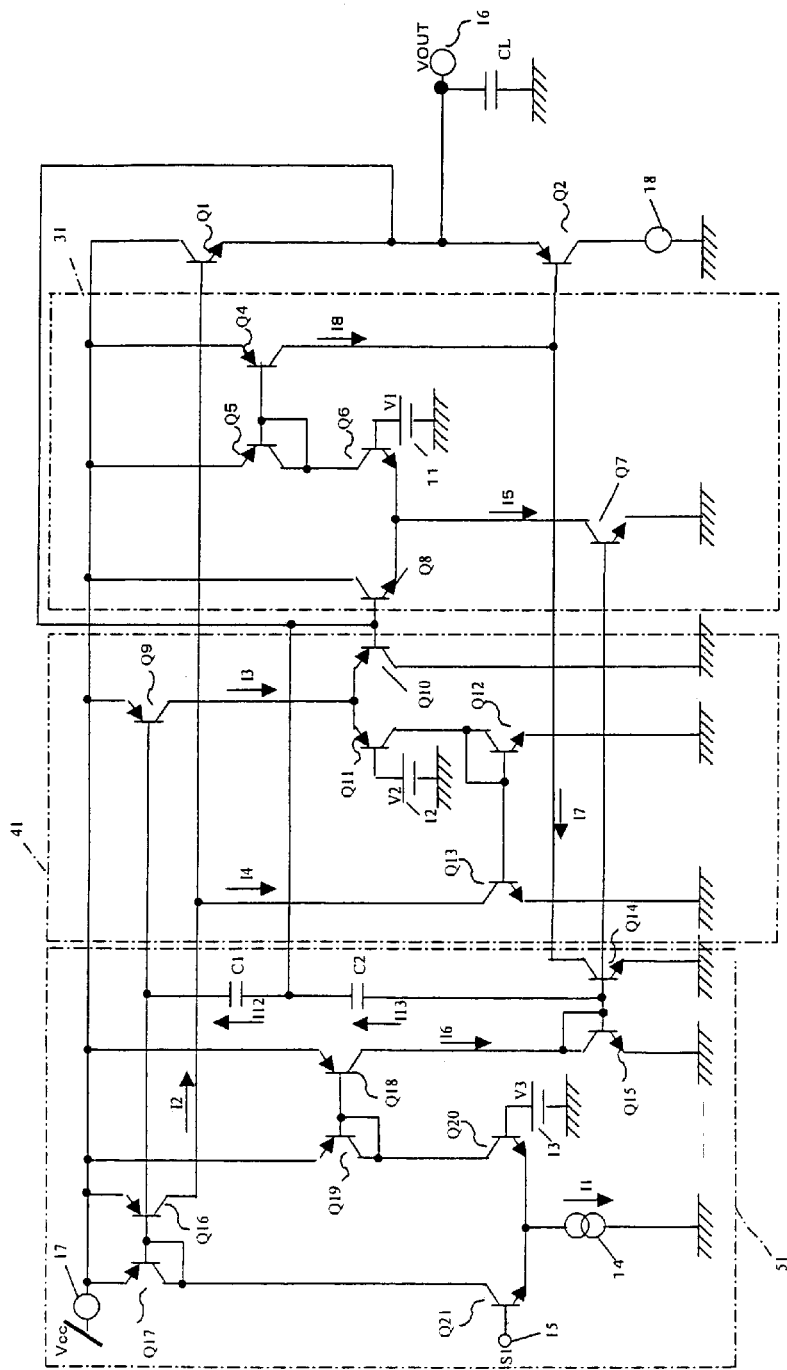
FIG. 4 is a circuit diagram showing detailed configuration of the capacitive load driving circuit of FIG. 3.

FIG. 2 is a circuit diagram showing detailed configuration of the capacitive load driving circuit of FIG. 1. Difference from FIG. 4 is that the over charging-current prevention switch circuit 61 and the overdischarging-current prevention switch circuit 71 are added. The other points are the same as those of FIG. 4.

In FIG. 2, like parts to FIG. 1 are designated by like numerals. The charging-current switch circuit 41 comprises transistors Q9, Q10, Q11, Q12, and Q13 and a constant voltage supply 12 for generating an electric potential defining the upper amplitude limit V2. More specifically, the constant voltage supply 12 generates an electric potential equal to the upper amplitude limit V2. In an exemplary case that the voltage applied to the power supply terminal 17 is 12 V, the upper amplitude limit V2 is set, for example, at approximately 10 V. In case that the capacitive load CL is composed, for example, of a common electrode of a liquid crystal display panel, the upper amplitude limit V2 is not fixed but variable in some cases for the purpose of adjustment of the visibility of the liquid crystal display panel. That is, the constant voltage supply 12 is replaced by a variable voltage supply in some cases.

The current I3 is the collector current of the transistor Q9. This current is set to be twice the current I2, and flows into the charging control differential switch circuit constructed by the transistors Q10 and Q11. The current I4 is the collector current of the transistor Q13. The current I3 satisfies the relation I3=2×I4. The transistors Q12 and Q13 constitute a current mirror circuit.

In the charging control differential switch circuit, one input terminal receives the electric potential of the capacitive load CL, that is, the electric potential VOUT of the output terminal 16. The other input terminal receives the electric potential of the constant voltage supply 12. Then, depending on the result of comparison between the electric potential of the capacitive load CL and the electric potential of the constant voltage supply 12, the charging control differential switch circuit performs on-off control of the base current of the output transistor Q1, that is, the first current I2.

The discharging-current switch circuit 31 comprises transistors Q4, Q5, Q6, Q7, and Q8 and a constant voltage supply 11 for generating an electric potential defining the lower amplitude limit V1. More specifically, the constant voltage supply 11 generates an electric potential equal to the lower amplitude limit V1. In an exemplary case that the voltage applied to the power supply terminal 17 is 12 V, the lower amplitude limit V1 is set, for example, at approximately 2 V. In case that the capacitive load CL is composed, for example, of a common electrode of a liquid crystal display panel, the lower amplitude limit V1 is not fixed but variable in some cases for the purpose of adjustment of the visibility of the liquid crystal display panel. That is, the constant voltage supply 11 is replaced by a variable voltage supply in some cases.

The current I5 is the collector current of the transistor Q7. This current is set to be twice the current I7, and flows out from the discharging control differential switch circuit constructed by the transistors Q6 and Q8. The current I8 is the collector current of the transistor Q4. The current I5 satisfies the relation I5=2×I8. The transistors Q4 and Q5 constitute a current mirror circuit.

In the discharging control differential switch circuit, one input terminal receives the electric potential of the capacitive load CL, that is, the electric potential VOUT of the output terminal 16. The other input terminal receives the electric potential of the constant voltage supply 11. Then, depending on the result of comparison between the electric potential of the capacitive load CL and the electric potential of the constant voltage supply 11, the discharging control differential switch circuit performs on-off control of the base current of the output transistor Q2, that is, the second current I7.

The charging and discharging-current generating circuit 51 comprises: transistors Q14, Q15, Q16, Q17, Q18, Q19, Q20, and Q21; capacitors C1 and C2 serving as frequency-dependent impedance elements or capacitive impedance elements; a constant voltage supply 13; and a constant current supply 14. The combination of the transistors Q14 and Q15, the combination of the transistors Q16 and Q17, and the combination of the transistors Q18 and Q19 constitute current mirror circuits respectively.

The transistors Q20 and Q21 constitute a differential switch circuit. In this differential switch circuit, one input terminal receives the electric potential of the load control input signal S1, while the other input terminal receives the electric potential V3 of the constant voltage supply 13. The emitters of the transistors Q20 and Q21 are connected to the constant current supply 14. The differential switch circuit compares the electric potential of the load control input signal S1 with the electric potential V3 of the constant voltage supply 13, and thereby determines the state (high level or low level) of the load control input signal S1 so as to switch the path through which the current I1 of the constant current supply 14 flows, depending on the determination result.

Figure 5:
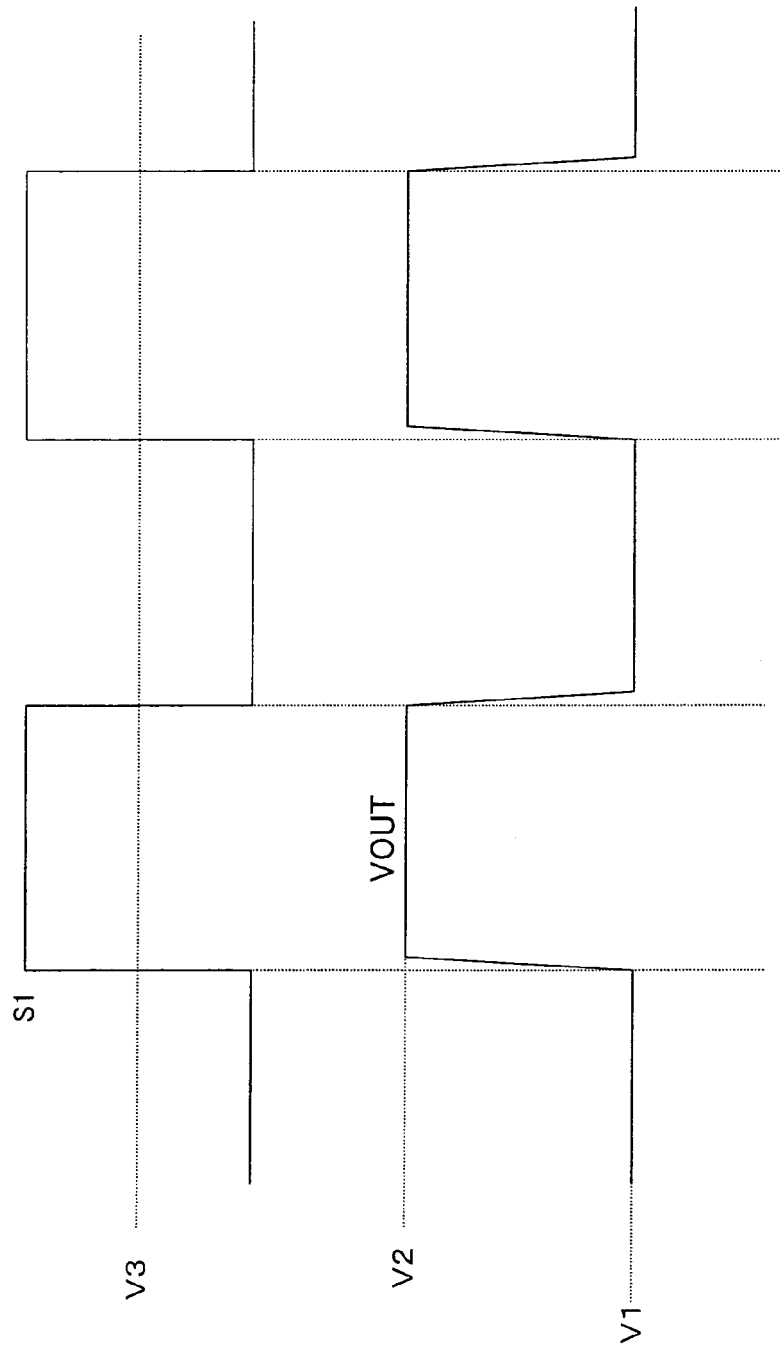
FIG. 5 is a waveform diagram illustrating the operation of the capacitive load driving circuit of FIG. 2.

FIG. 5 shows output waveforms of the capacitive load driving circuit of FIGS. 1 and 2. FIG. 5 is wave form diagrams showing the load control input signal S1 and the voltage VOUT appearing in the output terminal 16. When the threshold voltage where the on-off state alternates in the charging-current switch circuit 41 is denoted by V2, and when the threshold voltage where the on-off state alternates in the discharging-current switch circuit 31 is denoted by V1, the load control input signal S1 is inputted to the input terminal 15, while the electric potential VOUT is obtained in the output terminal 16.

The operation of the circuit of FIG. 2 is described below in detail with reference to FIG. 5. Described below is a charging period where the load control input signal S1 applied to the input terminal 15 alternates from a low level to a high level.

When the voltage applied to the input terminal 15, that is, the electric potential of the load control input signal S1, goes higher than the electric potential V3 of the constant voltage supply 13, the transistor Q21 goes on. At this time, all of the current I1 of the constant current supply 14 flows through the transistor Q21. The transistor Q21 is connected to the current mirror circuit constructed by the transistors Q17 and Q16. This current mirror circuit allows the transistor Q16 to output the current I2 as the collector current. The amount of the current I2 is the same as the current I1 in a stationary state.

The collector of the transistor Q16 is connected to the base of the charging output transistor Q1 and the collector of the transistor Q13. In general, when the load control input signal S1 applied to the input terminal 15 alternates from a low level to a high level, the electric potential of the output terminal 16 is lower than the electric potential V2 of the constant voltage supply 12. Accordingly, in the charging control differential switch circuit constructed by the transistors Q10 and Q11, the transistor Q10 is on. Thus, no current flows through the transistor Q11. Since the transistor Q13 is connected to the transistor Q11 via the current mirror circuit, no current flows through the transistor Q13. As a result, the collector current I4 of the transistor Q13 is zero.

Consequently, all of the current I2 serves as the base current of the charging output transistor Q1.

Since the current I2 flows into the charging output transistor Q1 as the base current, this transistor supplies the emitter current in an amount of hfe-times the base current, to the capacitive load CL. At that time, since no base current is supplied to the discharging output transistor Q2, all of the emitter current of the charging output transistor Q1 flows into the capacitive load CL. This current causes the electric potential VOUT of the output terminal 16 to go higher as shown in FIG. 5.

When the electric potential VOUT of the output terminal 16 becomes equal to the electric potential V2 of the constant voltage supply 12, the same amount of currents flow respectively through the transistors Q10 and Q11. The amount of each current is half of the collector current I3 of the transistor Q9. However, in this circuit, the current I3 is set to be twice the current I2. As a result, a current of the same amount as the current I2 flows through the transistor Q11.

The current flowing through the transistor Q11 flows through the current mirror circuit constructed by the transistors Q12 and Q13, and thereby causes the collector current I4 of the transistor Q13. Since the amount of the current I4 is the same as the current I2, all of the collector current I2 provided by the transistor Q16 flows into the transistor Q13, so that the supply of the base current to the output transistor Q1 is stopped. When the supply of the base current is stopped, the output transistor Q1 stops the supply of the charging-current to the capacitive load CL. As a result, the electric potential VOUT of the output terminal 16 is set to be the electric potential V2 of the constant voltage supply 12.

Described below next is a discharging period where the load control input signal S1 applied to the input terminal 15 as shown in FIG. 5 alternates from a high level to a low level.

When the voltage applied to the input terminal 15, that is, the electric potential of the load control input signal S1, goes lower than the electric potential V3 of the constant voltage supply 13, the transistor Q20 goes on. At this time, all of the current I1 of the constant current supply 14 flows through the transistor Q20. The transistor Q20 is connected to the current mirror circuit constructed by the transistors Q18 and Q19. This current mirror circuit allows the transistor Q18 to output the collector current I6. The amount of the collector current I6 is the same as the current I1 of the constant current supply 14. The transistor Q18 is connected to the current mirror circuit constructed by the transistors Q14 and Q15. This current mirror circuit causes the collector current I7 through the transistor Q14. The amount of the current I6 is the same as the current I7 in a stationary state.

The collector of the transistor Q14 is connected to the base of the discharging output transistor Q2 and the collector of the transistor Q4. In general, when the load control input signal S1 applied to the input terminal 15 alternates from a high level to a low level, the electric potential of the output terminal 16 is higher than the electric potential V1 of the constant voltage supply 11. Accordingly, in the charging control differential switch circuit constructed by the transistors Q6 and Q8, the transistor Q8 is on. Thus, no current flows through the transistor Q6. Since the transistor Q4 is connected to the transistor Q6 via the current mirror circuit, no current flows through the transistor Q4. As a result, the collector current I8 of the transistor Q4 is zero.

Consequently, all of the current I7 serves as the base current of the discharging output transistor Q2.

Since the current I7 flows out from the discharging output transistor Q2 as the base current, this transistor withdraws the emitter current in an amount of hfe-times the base current, from the capacitive load CL. At that time, since no base current is supplied to the charging output transistor Q1, all of the emitter current of the discharging output transistor Q2 is supplied from the capacitive load CL. This current causes the electric potential VOUT of the output terminal 16 to go lower as shown in FIG. 5.

When the electric potential VOUT of the output terminal 16 becomes equal to the electric potential V1 of the constant voltage supply 11, the same amount of currents flow respectively through the transistors Q6 and Q8. The amount of each current is half of the collector current I5 of the transistor Q7. However, in this circuit, the current I5 is set to be twice the current I7. As a result, a current of the same amount as the current I7 flows through the transistor Q6.

The current flowing through the transistor Q6 flows through the current mirror circuit constructed by the transistors Q4 and Q5, and thereby causes the collector current I8 of the transistor Q4. Since the amount of the current I8 is the same as the current I7, all of the collector current I7 provided by the transistor Q14 flows out from the transistor Q4, so that the supply of the base current to the output transistor Q2 is stopped. When the supply of the base current is stopped, the output transistor Q2 stops the withdrawal of the discharging-current from the capacitive load CL. As a result, the electric potential VOUT of the output terminal 16 is set to be the electric potential V1 of the constant voltage supply 11.

As described above, the configuration that the charging and discharging control circuit 22 is constructed by the charging-current switch circuit 41 and the discharging-current switch circuit 31 permits the complete shut-off of the charging and discharging-currents supplied to the output circuit 21, and thereby realizes low electric power consumption. This allows the capacitive load driving circuit to be easily built in a driver integrated circuit for driving a liquid crystal display panel.

Further, the output voltage amplitude of the output circuit 21 is defined by the charging-current switch circuit 41 and the discharging-current switch circuit 31, and the charging-current switch circuit 41 and the discharging-current switch circuit 31 are composed respectively of the charging-current control differential switch circuit and the discharging-current control differential switch circuit having a good temperature characteristic. This avoids the problem of variation in the output voltage amplitude of the output circuit 21 caused by temperature variation.

Described below is the operation of the capacitors C1 and C2 provided in the charging and discharging-current generating circuit 51. According to this configuration comprising the capacitors C1 and C2, even when the through-rate is high in the load control input signal S1, a steep change in the base current I2 is alleviated by the impedance of the capacitor C1 which is proportional to the frequency component. Similarly, a steep change in the base current I7 is alleviated by the impedance of the capacitor C2 which is proportional to the frequency component. This avoids a steep change in the charging and discharging-currents, and hence provides a stable output waveform without an overshoot and an undershoot.

This point is described below in detail. In case that the capacitors C1 and C2 are not provided, the operation becomes as follows.

When the load control input signal S1 applied to the input terminal 15 is a pulse signal having a high through-rate, the change in the base currents of the charging and discharging output transistors Q1 and Q2 becomes steep. Thus, in the charging, in case that a time difference occurs between the time when the electric potential VOUT of the output terminal 16 reaches the electric potential V2 of the constant voltage supply 12 and the time when the supply of the base current to the output transistor Q1 is stopped, an overcharging-current is supplied to the capacitive load CL. In the discharging, in case that a time difference occurs between the time when the electric potential VOUT of the output terminal 16 reaches the electric potential V1 of the constant voltage supply 11 and the time when the supply of the base current to the output transistor Q2 is stopped, an overdischarging-current is withdrawn from the capacitive load CL. This causes an overshoot and an undershoot where the amplitude of the electric potential VOUT of the output terminal 16 goes outside the lower amplitude limit V1 and the upper amplitude limit V2 which are set by the constant voltage supplies 11 and 12, respectively.

In the circuit of FIGS. 1 and 2, a part of the output current of the output circuit 21 is fed back to the charging and discharging-current generating circuit 51 via the capacitors C1 and C2 serving as frequency-dependent impedance elements provided between the charging and discharging-current generating circuit 51 and the output circuit 21, so that the through-rate is suppressed at the alternation of the output state of the charging and discharging-current generating circuit 51, so that the supply of an overcharging-current and an overdischarging-current is avoided.

The operation in the charging is described below first. When a current I2 is suddenly supplied as the base current to the charging output transistor Q1, the output transistor Q1 suddenly tries to supply a charging-current to the capacitive load CL. This current flows also through the capacitor C1 as a current I12. The capacitor C1 is connected to the collector of the transistor Q21 for supplying the current I2, so that the current I12 constitutes a part of the collector current of the transistor Q21.

The sudden change in the charging-current flowing through the output transistor Q1 indicates that a large amount of high-frequency component current is contained. Thus, the reactance of the capacitor C1 becomes smaller for the current I12. Accordingly, a more sudden change causes a larger amount of current I12. Since the amount of the collector current of the transistor Q17 is equal to I1–I12, a larger amount of the current I12 causes a smaller amount of the collector current of the transistor Q17. The transistor Q17, together with the transistor Q16, constitutes a current mirror circuit, so as to supply the base current I2 to the output transistor Q1. Thus, a decrease in the collector current of the transistor Q17 causes a decrease in the current I2 serving as the base current of the output transistor Q1, and hence reduces the amount of the charging-current. As a result, no steep change occurs in the charging-current.

The operation in the discharging is described next. When a current I7 is suddenly supplied as the base current to the discharging output transistor Q2, the output transistor Q2 suddenly tries to withdraw a discharging-current from the capacitive load CL. This current flows also through the capacitor C2 as a current I13. The capacitor C2 is connected to the collector of the transistor Q18 for supplying the current I7, so that the current I13 constitutes a part of the collector current of the transistor Q18.

The sudden change in the discharging-current flowing through the output transistor Q2 indicates that a large amount of high-frequency component current is contained. Thus, the reactance of the capacitor C2 becomes smaller for the current I13. Accordingly, a more sudden change causes a larger amount of current I13. Since the amount of the collector current of the transistor Q15 is equal to I6−I13, a larger amount of the current I13 causes a smaller amount of the collector current of the transistor Q15. The transistor Q15, together with the transistor Q14, constitutes a current mirror circuit, so as to supply the base current I7 to the output transistor Q2. Thus, a decrease in the collector current of the transistor Q15 causes a decrease in the base current I7 of the output transistor Q2, and hence reduces the amount of the discharging-current. As a result, no steep change occurs in the discharging-current.

By virtue of these operation, even when the load control input signal S1 applied to the input terminal 15 is a pulse signal having a high through-rate, no overcharging-current and no overdischarging-current is supplied to the capacitive load CL.

As such, in this capacitive load driving circuit, even when the through-rate is high in the load control input signal S1, the capacitors C1 and C2 serving as frequency-dependent impedance elements restrict the through-rate, so as to permit smooth alternation of the charging and discharging-currents. This avoids an overshoot and an undershoot at the alternation of the charging and discharging-currents. This provides a stable output waveform without an overshoot and an undershoot, and hence avoids a steep change in the charging and discharging-currents.

The electric potential V1 and V2 generated by the constant voltage supplies 11 and 12 in the above-mentioned description may be generated arbitrarily by a resistor type voltage divider circuit for dividing a power supply voltage, or alternatively may be inputted as arbitrary voltage values through external electrodes. In order that these values be variable, the resistor type voltage divider circuit can be implemented using a variable resistor as the divider resistor.

As shown in FIG. 2, the overcharging-current prevention switch circuit 61 is composed of an NPN transistor Q25 the collector of which is connected to the base of the output transistor Q1, and the emitter of which is connected to the output terminal 16, and further the base of which is connected to a constant voltage supply 19. The constant voltage supply 19 generates a predetermined electric potential higher than the electric potential of the ground terminal 17 and lower than or equal to the lower amplitude limit V1. In this embodiment, this generated electric potential is equal to the lower amplitude limit V1.

The overdischarging-current prevention switch circuit 71 is composed of an PNP transistor Q26 the collector of which is connected to the base of the output transistor Q2, and the emitter of which is connected to the output terminal 16, and further the base of which is connected to a constant voltage supply 20. The constant voltage supply 20 generates a predetermined electric potential lower than the electric potential of the power supply terminal 17 and higher than or equal to the upper amplitude limit V2. In this embodiment, this generated electric potential is equal to the upper amplitude limit V2.

In this case, the constant voltage supplies 19 and 20 may be replaced by variable voltage supplies for generating variable voltages, so that these variable voltage supplies may operate in linkage with the changes in the electric potentials of other variable voltage supplies used in place of the constant voltage supplies 11 and 12.

According to this configuration, when the electric potential of the constant voltage supply 11 or 12 is adjusted for the purpose of adjusting the upper amplitude limit V2 or the lower amplitude limit V1 of the capacitive load CL, avoided is the occurrence of mismatching with the electric potential where the overcurrent protection circuit 23 stops the charging-current supplying operation or the discharging-current withdrawing operation. This avoids the occurrence of abnormality in the control operation of the charging control differential switch circuit and the discharging control differential switch circuit.

The above-mentioned abnormality is described below in detail. When the voltage of the constant voltage supply 20 is lower than the upper amplitude limit V2 by an amount of the emitter-base voltage Veb of the PNP transistor Q26 or more, the PNP transistor Q26 serves as a voltage clipping circuit, so that the voltage of the output terminal 16 does not reach the predetermined upper amplitude limit V2, but stays at a voltage of V20+Vbe. Here, V20 indicates the voltage of the constant voltage supply 20.

When the voltage of the constant voltage supply 19 is higher than the lower amplitude limit V1 by an amount of the emitter-base voltage Veb of the NPN transistor Q25 or more, the PNP transistor Q25 serves as a voltage clipping circuit, so that the voltage of the output terminal 16 does not reach the predetermined lower amplitude limit V1, but stays at a voltage of V19-Vbe. Here, V19 indicates the voltage of the constant voltage supply 19.

The operation of the overcharging-current prevention switch circuit 61 and the overdischarging-current prevention switch circuit 71 is described below in detail with reference to FIG. 2.

When the electric potential of the input terminal 15 is high, all of the current I1 flows through the transistor Q21. The current I1 flows through the current mirror circuit constructed by the transistors Q16 and Q17, so as to cause a current I2 serving as the base current of the output transistor Q1 which flows into the base of the output transistor Q1. When receiving the base current, the output transistor Q1 supplies a charging-current from the emitter to the capacitive load CL. This charging-current flows ceaselessly until the electric potential VOUT of the output terminal 16 reaches the upper amplitude limit V2 so as to cause the charging-current switch circuit 41 to shut off the base current. When the electric potential of the input terminal 15 is high, no base current is supplied to the discharging output transistor Q2, so that the discharging output transistor Q2 is off.

In this case, when a short circuit (earth fault) occurs between the output terminal 16 and the ground terminal 18, the electric potential VOUT of the output terminal 16 becomes a value sufficiently lower than the lower amplitude limit V1. This causes the NPN transistor Q25 to be on, so that a collector current I9 flows. At this time, all of the current I2 serves as the current I9. Thus, the base current of the output transistor Q1 is shut off, so that the supply of the charging-current to the output terminal 16 is stopped. As a result, an overcharging-current is prevented from flowing ceaselessly through the output transistor Q1 when an earth fault occurs in the output terminal 16.

In the configuration of the circuit of FIG. 2, the current I9 flowing through the NPN transistor Q25 flows into the capacitive load CL. However, this current is equivalent to the base current of the output transistor Q1, and hence negligible small. In case that the overcharging-current prevention switch circuit 61 is constructed by differential transistors in place of a single NPN transistor, the current equivalent to the current I9 is prevented from flowing into the capacitive load CL.

On the contrary, when the electric potential of the input terminal 15 is low, all of the current I1 flows through the transistor Q20. The current I1 flows through the current mirror circuit constructed by the transistors Q18 and Q19 and the current mirror circuit constructed by the transistors Q14 and Q15, so as to cause a current I7 serving as the base current of the output transistor Q2 which is withdrawn from the base of the output transistor Q2. When the base current is withdrawn, the output transistor Q2 withdraws a discharging-current from the capacitive load CL via the emitter. This discharging-current flows ceaselessly until the electric potential VOUT of the output terminal 16 reaches the lower amplitude limit V1 so as to cause the discharging-current switch circuit 31 to shut off the base current. When the electric potential of the input terminal 15 is low, no base current is supplied to the charging output transistor Q1, so that the charging output transistor Q1 is off.

In this case, when a short circuit (sky fault) occurs between the output terminal 16 and the power supply terminal 17, the electric potential VOUT of the output terminal 16 becomes a value sufficiently higher than the upper amplitude limit V2. This causes the PNP transistor Q26 to be on, so that a collector current I10 flows. At this time, all of the current I7 serves as the current I10. Thus, the base current of the output transistor Q2 is shut off, so that the withdrawal of the discharging-current from the output terminal 16 is stopped. As a result, an overdischarging-current is prevented from flowing ceaselessly through the output transistor Q2 when an sky fault occurs in the output terminal 16.

When the capacitive load driving circuit according to the invention is used for driving a liquid crystal display panel common electrode, high driving performance is obtained, while a circuit for preventing an overcurrent is built in. This avoids the necessity of a buffer circuit and a protection circuit having been attached externally in the prior art, and hence reduces the number of components.

Furthermore, the present configuration that the charging and discharging-currents are shut off when predetermined upper amplitude limit are lower amplitude limit are reached realizes low electric power consumption.

FIG. 1
31 Discharging current switch circuit
41 Charging current switch circuit
51 Charging and discharging-current generating circuit
61 Overcharging current prevention switch circuit
71 Overdischarging-current prevention switch circuit

What is claimed is:

1. A capacitive load driving circuit for supplying a charging-current to a capacitive load and withdrawing a discharging-current from said capacitive load, the load driving circuit comprising:

an output circuit which comprises a power supply terminal, a ground terminal, and an output terminal connected to said capacitive load, and which performs a charging-current supplying operation of supplying a charging-current from said power supply terminal to said capacitive load and a discharging-current withdrawing operation of withdrawing a discharging-current from said capacitive load to said ground terminal; and an overcurrent protection circuit that detects a short circuit between said output terminal and said ground terminal so as to stop or suppress said charging-current supplying operation, and that detects a short circuit between said output terminal and said power supply terminal so as to stop or suppress said discharging-current withdrawing operation, wherein:

said output circuit selects any one of said charging-current supplying operation and said discharging-current withdrawing operation depending on the state of a control input signal, said output circuit comprises: a first NPN transistor the collector of which is connected to said power supply terminal and the emitter of which is connected to said output terminal; and a first PNP transistor the collector of which is connected to said ground terminal and the emitter of which is connected to said output terminal, and said overcurrent protection circuit comprises: a second NPN transistor the collector of which is connected to the base of said first NPN transistor, and the emitter of which is connected to said output terminal, and further the base of which is connected to a first voltage supply for-generating a predetermined electric potential higher than the electric potential of said ground terminal; and-a second PNP transistor the collector of which is connected to the base of said first PNP transistor, and the emitter of which is connected to said output terminal, and further the base of which is connected to a second voltage supply for generating a predetermined electric potential lower than the electric potential of said power supply terminal.

2. A capacitive load driving circuit for supplying a charging-current to a capacitive load and withdrawing a discharging-current from said capacitive load, the load driving circuit comprising:

an output circuit which comprises a power supply terminal, a ground terminal, and an output terminal connected to said capacitive load, and which performs a charging-current supplying operation of supplying a charging-current from said power supply terminal to said capacitive load and a discharging-current withdrawing operation of withdrawing a discharging-current from said capacitive load to said ground terminal; and an overcurrent protection circuit that detects a short circuit between said output terminal and said ground terminal so as to stop or suppress said charging-current supplying operation, and that detects a short circuit between said output terminal and said power supply terminal so as to stop or suppress said discharging-current withdrawing operation, wherein:

said output circuit selects any one of said charging-current supplying operation and said discharging-current withdrawing operation depending on the state of a control input signal, said output circuit continues to charge said capacitive load in said charging-current supplying operation until the electric potential of said capacitive load reaches a predetermined upper amplitude limit lower than the electric potential of said power supply terminal, and continues to discharge said capacitive load in said discharging-current withdrawing operation until the electric potential of said capacitive load reaches a predetermined lower amplitude limit higher than the electric potential of said ground terminal, said output circuit comprises: a first NPN transistor the collector of which is connected to said power supply terminal and the emitter of which is connected to said output terminal; and a first PNP transistor the collector of which is connected to said ground terminal and the emitter of which is connected to said output terminal, and said overcurrent protection circuit comprises: a second NPN transistor the collector of which is connected to the base of said first NPN transistor, and the emitter of which is connected to said output terminal, and further the base of which is connected to a first voltage supply for generating a predetermined electric potential that is higher than the electric potential of said ground terminal and lower than or equal to said lower amplitude limit; and a second PNP transistor the collector of which is connected to the base of said first PNP transistor, and the emitter of which is connected to said output terminal, and further the base of which is connected to a second voltage supply for generating a predetermined electric potential that is lower than the electric potential of said power supply terminal and higher than or equal to said upper amplitude limit.

3. A capacitive load driving circuit for supplying a charging-current to a capacitive load and withdrawing a discharging-current from said capacitive load, the load driving circuit comprising:

an output circuit which comprises a power supply terminal, a ground terminal, and an output terminal connected to said capacitive load, and which performs a charging-current supplying operation of supplying a charging-current from said power supply terminal to said capacitive load and a discharging-current withdrawing operation of withdrawing a discharging-current from said capacitive load to said ground terminal;

a current generation circuit that selects, depending on the state of a control input signal, any one of a first state where a first current is supplied to said output circuit so as to cause said output circuit to select said charging-current supplying operation and a second state where a second current is supplied to said output circuit so as to cause said output circuit to select said discharging-current withdrawing operation;

a charging and discharging control circuit that detects the electric potential of said capacitive load and thereby controls and causes said output circuit to continue said charging-current supplying operation until the electric potential of said capacitive load reaches a predetermined upper amplitude limit, to stop said charging-current supplying operation when said electric potential reaches said predetermined upper amplitude limit, to continue said discharging-current withdrawing operation until the electric potential of said capacitive load reaches a predetermined lower amplitude limit, and to stop said discharging-current withdrawing operation when said electric potential reaches said predetermined lower amplitude limit; and an overcurrent protection circuit that detects a short circuit between said output terminal and said ground terminal so as to stop or suppress said charging-current supplying operation, and that detects a short circuit between said output terminal and said power supply terminal so as to stop or suppress said discharging-current withdrawing operation, wherein:

said output circuit comprises: a first NPN transistor the collector of which is connected to said power supply terminal and the emitter of which is connected to said output terminal; and a first PNP transistor the collector of which is connected to said ground terminal and the emitter of which is connected to said output terminal, said overcurrent protection circuit comprises: a second NPN transistor the collector of which is connected to the base of said first NPN transistor, and the emitter of which is connected to said output terminal, and further the base of which is connected to a first voltage supply for generating a predetermined electric potential that is higher than the electric potential of said ground terminal and lower than or equal to said lower amplitude limit; and a second PNP transistor the collector of which is connected to the base of said first PNP transistor, and the emitter of which is connected to said output terminal, and further the base of which is connected to a second voltage supply for generating a predetermined electric potential that is lower than the electric potential of said power supply terminal and higher than or equal to said upper amplitude limit, and said charging and discharging control circuit controls the base currents of said first NPN transistor and said first PNP transistor, so as to control the execution and the stop of said charging-current supplying operation and said discharging-current withdrawing operation.

4. A capacitive load driving circuit according to claim 3, wherein said charging and discharging control circuit comprises:

a third voltage supply that generates an electric potential equal to said upper amplitude limit;

a fourth voltage supply that generates an electric potential equal to said lower amplitude limit;

a charging control differential switch circuit, one input terminal of which receives the electric potential of said capacitive load, and the other input terminal of which receives the electric potential of said third voltage supply; and a discharging control differential switch circuit, one input terminal of which receives the electric potential of said capacitive load, and the other input terminal of which receives the electric potential of said fourth voltage supply; and wherein:

said charging control differential switch circuit performs on-off control of the base current of said first NPN transistor depending on a result of comparison between the electric potential of said capacitive load and the electric potential of said third voltage supply, while said discharging control differential switch circuit performs on-off control of the base current of said first PNP transistor depending on a result of comparison between the electric potential of said capacitive load and the electric potential of said fourth voltage supply.

5. A capacitive load driving circuit according to claim 4, wherein:

the electric potentials of said third and fourth voltage supplies are variable, and the electric potential of said first voltage supply varies in linkage with the electric potential of said fourth voltage supply, while the electric potential of said second voltage supply varies in linkage with the electric potential of said third voltage supply.

6. A capacitive load driving circuit according to claim 4, wherein the electric potential of said first voltage supply is equal to the electric potential of said fourth voltage supply, while the electric potential of said second voltage supply is equal to the electric potential of said third voltage supply.

* * * * *